(No Model.)
W. A. G. SCHONHEYDER.
FLUID PRESSURE ENGINE.
No. 340,369. Patented Apr. 20, 1886.
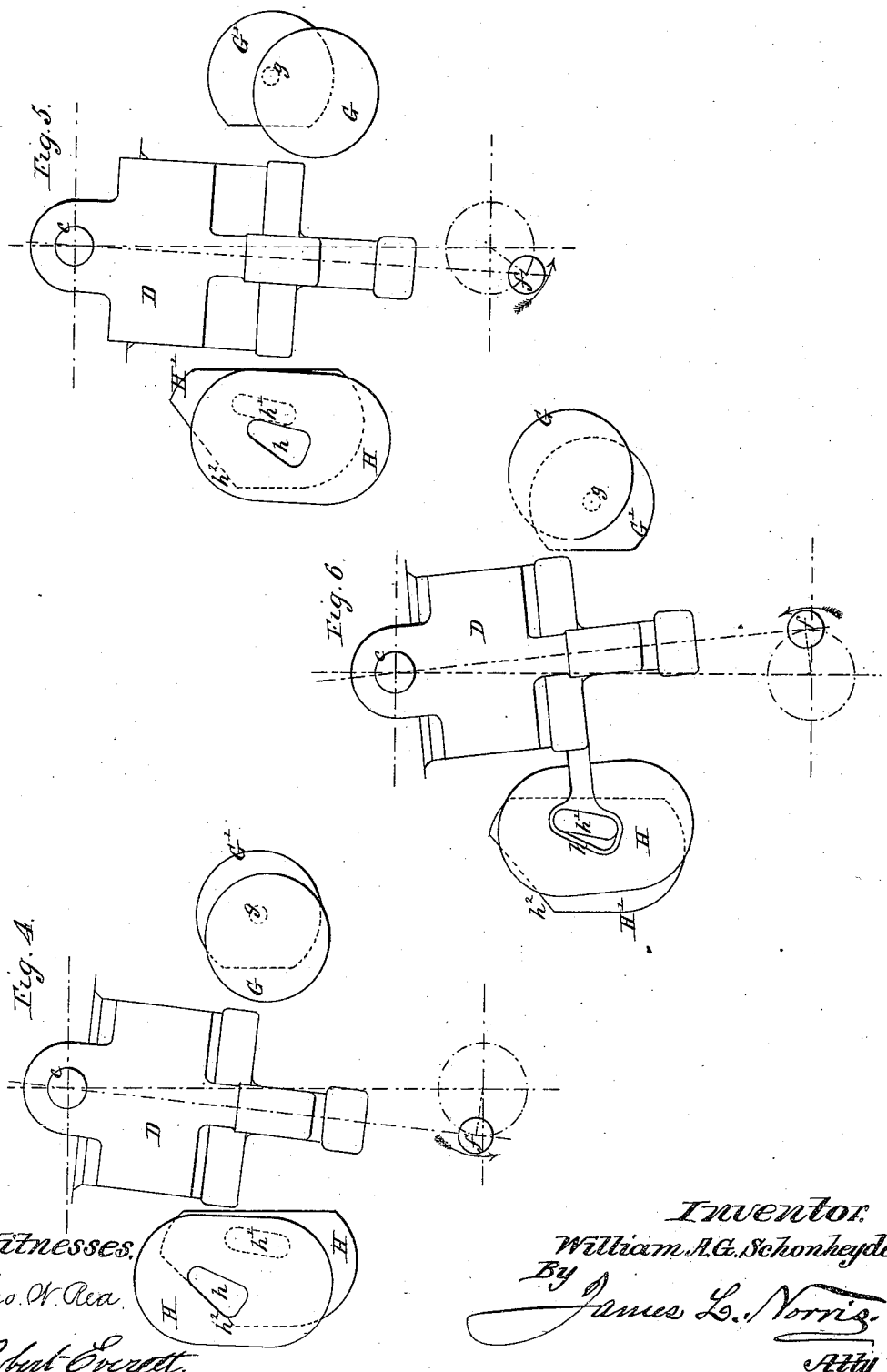

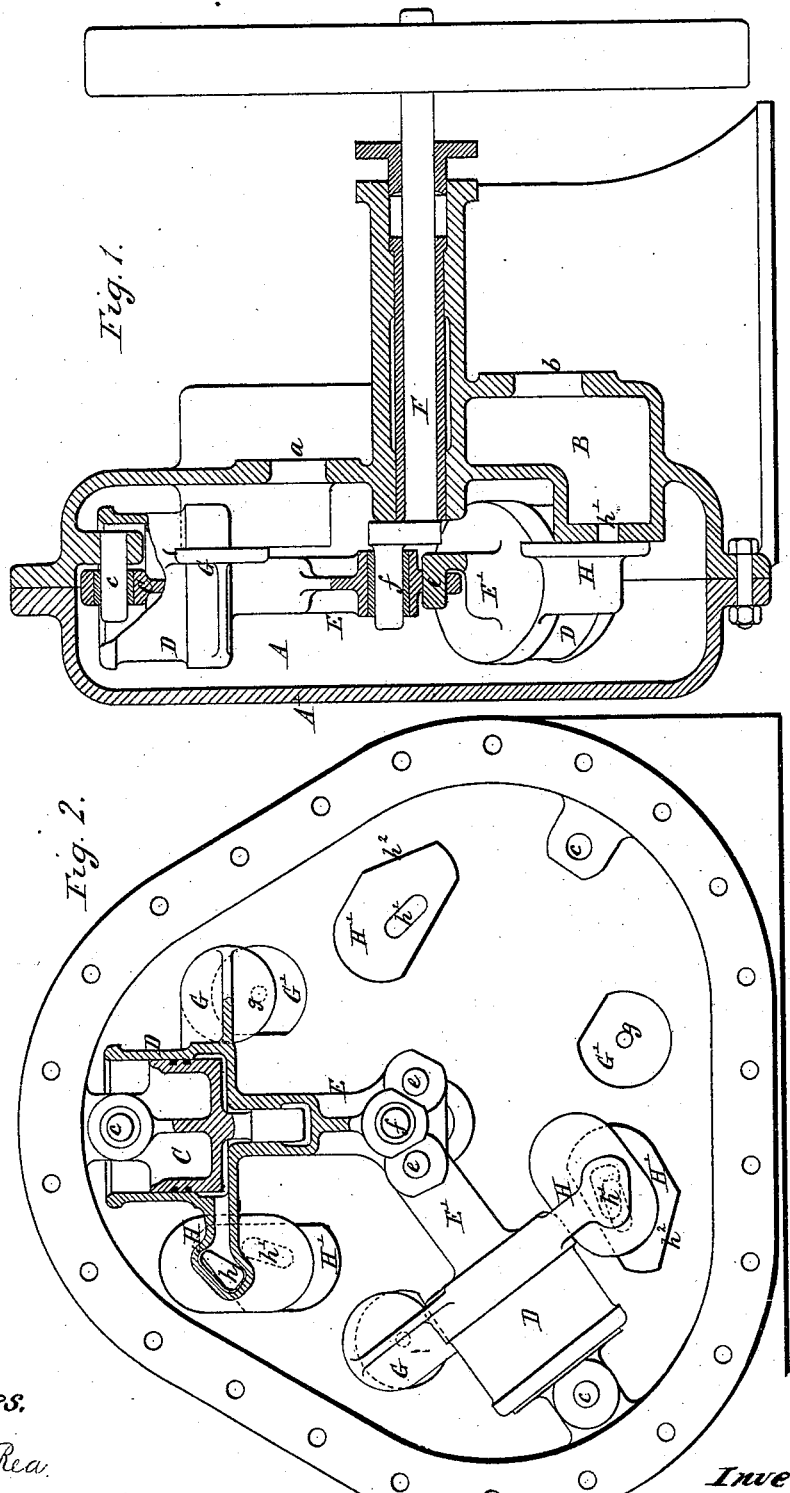

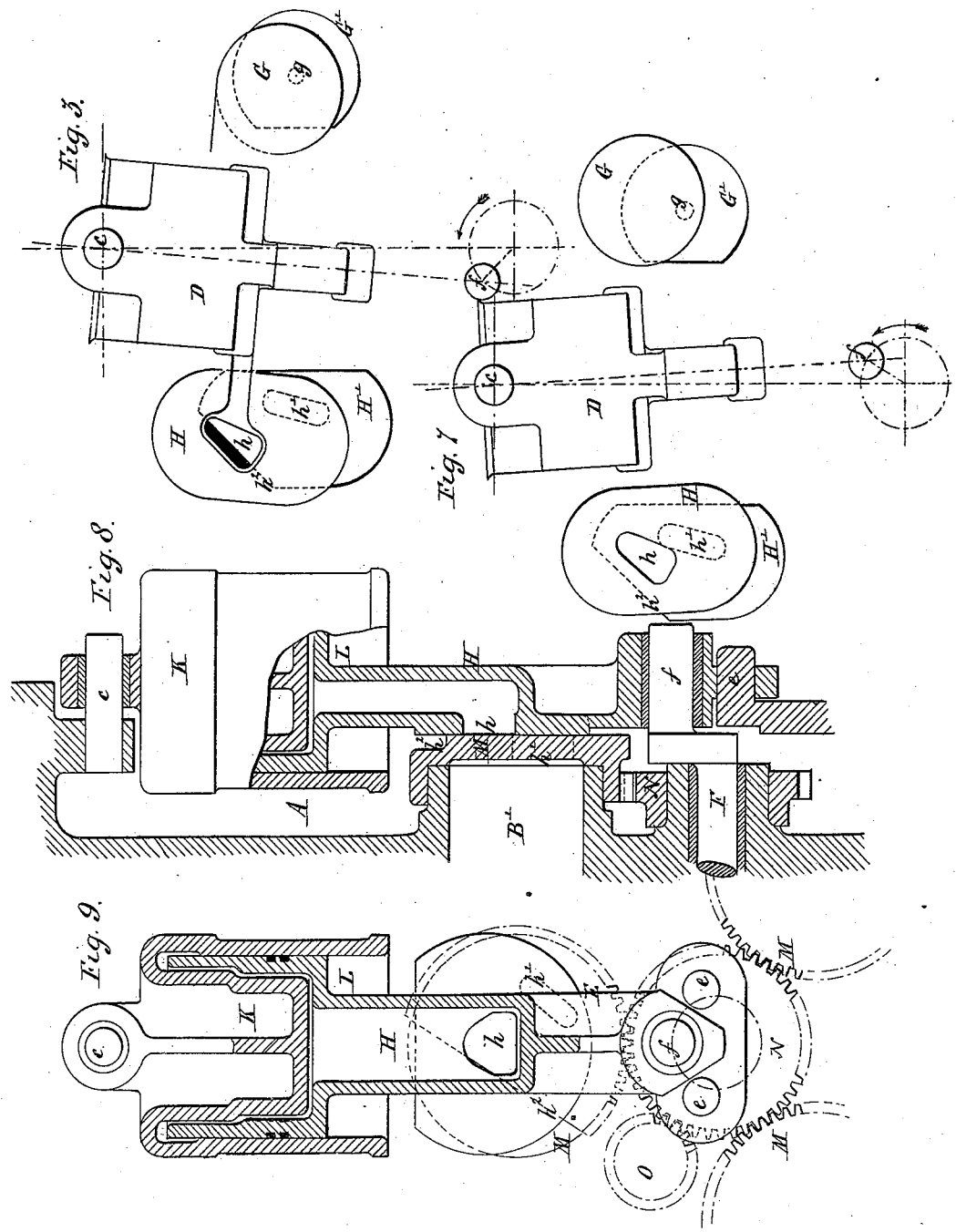

United States Patent Office.

WILLIAM ANTON GOTTLIEB SCHÖNHEYDER, OF SHEPHERD'S BUSH, COUNTY OF MIDDLESEX, ENGLAND.

FLUID-PRESSURE ENGINE.

SPECIFICATION forming part of Letters Patent No. 340,369, dated April 20, 1886.

Application filed December 14, 1885. Serial No. 185,639. (No model.) Patented in England July 14, 1885, No. 8,543.

*To all whom it may concern:*

Be it known that I, WILLIAM ANTON GOTTLIEB SCHÖNHEYDER, a citizen of England, residing at Shepherd's Bush, in the county of Middlesex, England, have invented a new and useful Fluid-Pressure Engine Applicable as a Liquid Meter or Pump, of which the following is a specification.

My invention relates to a compact and simple construction of engine that can be worked by steam or other elastic fluid, or by water or other inelastic fluid under pressure, or can be used as a meter of liquid passing through and working it, or as a pump when it is worked by extraneous power, as I will explain, referring to the accompanying drawings, showing a three-cylinder engine or meter according to my invention.

Figure 1 is a vertical section of the engine. Fig. 2 is a front view showing the interior of the casing with one of the three cylinders drawn in section and one supposed to be removed. Figs. 3, 4, 5, 6, and 7 represent five successive attitudes of one of the cylinders and its port, showing how the supply and discharge of the working-fluid are alternated. Fig. 8 is a vertical section, and Fig. 9 is a vertical section taken at right angles to Fig. 8, showing one of the cylinders in a modified form and means of varying the cut-off of the working-fluid and of reversing the engine.

In all these figures corresponding parts are marked by similar letters of reference.

Within a casing, A, which by an inlet, $a$, is supplied with the working-fluid, and which has at the back a cavity, B, from which fluid is discharged by an outlet, $b$, I mount upon three symmetrically-arranged pivots or pins, $c$, three pistons, C, which are free to oscillate on the pins $c$. Each piston is fitted with suitable packing within a cylinder, D, which can reciprocate to and fro on the piston. Each cylinder has projecting from the middle of its end cover an arm, E. One of these arms E has an eye bushed to fit on a crank-pin, $f$, and the other two arms—such as that marked E'—are hooked to E by pins $e$. Thus all three cylinders are linked to the one crank $f$ on the shaft F, which is carried in a long bearing and through packing to the outside of the casing. From the one side of each cylinder D projects an arm, G, terminating in a circular facing, which is pressed by the fluid in the casing A on a corresponding stationary facing, G', having through it a hole, $g$, leading to the discharge-chamber B. From the other side of each cylinder D projects a hollow arm, H, terminating in an elongated facing, which bears on a stationary facing, H', having also through it a hole, $h'$, leading to B. The hollow of the arm H, which has a mouth, $h$, serves as a passage for fluid to and from the cylinder D, the supply and discharge being in each case alternated by the exposure of the mouth $h$ over the edge of H' and by the coincidence of the mouth $h$ with the hole $h'$, as will be understood on reference to Figs. 3, 4, 5, 6, and 7.

Thus in Fig. 3, the mouth $h$ overlapping the edge of H', a full supply of fluid is being admitted to D; in Fig. 4 the supply is just cut off; in Fig. 5 the mouth $h$ is approaching the hole $h'$; in Fig. 6, the mouth $h$ being coincident with $h'$, there is free discharge from D; and, finally, in Fig. 7 the discharge is just cut off. As each of the three cylinders D passes through these phases in rotation, there is always one or other of them acting on the crank $f$, causing the shaft F to revolve continuously and the strain is always that of tension.

In the modified arrangement shown in Figs. 8 and 9 the cylinder K is pivoted on $c$, and the piston L has a central hollow arm, H, with mouth $h$, serving as the supply and discharge passage. In this case the facing of H moves over a facing piece, M, which has an edge, $h^2$, and a hole, $h'$, through it. Each of the facing pieces M is fitted to turn round a circular seating, and has teeth engaging with those of a wheel, N, that is free to turn round on a boss of the bearing of the shaft F. The wheel N, which gears with the three facing pieces M, gears also with a pinion, O, that can be turned round from outside the casing. When it is desired to reverse the engine, O is turned until each of the facing pieces M is brought by the gearing round to a position in which the edge $h^2$ and the hole $h'$ are in an attitude inverted relatively to the center line of its cylinder. When M is turned to a middle position, $h^2$ being then at right angles to the center line, the engine is stopped, and with positions of M intermediate between its middle and its two extreme positions the cut-off is effected sooner or later in each stroke for the one or the other direction of movement.

When the apparatus is intended to be worked by water or other liquid under pressure, the holes $h'$ and edges $h^2$ are so formed as to allow the fluid to flow into and out of each cylinder during almost the whole stroke, and the same applies when the apparatus is used as a liquid meter or pump, the shaft F in the case of a meter working a counter with suitable indices, and being in the case of a pump worked by extraneous power.

It will be seen that an engine, meter, or pump constructed as described can be readily taken to pieces for inspection or repair and put together again. Thus, when the front A′ of the casing is taken off, the cylinders can be slid off the pins $c$ and the crank-pin $f$. When the cylinders are in position, they are kept so by the pressure of the fluid in the casing A bearing their faces G and H against G′ and H′, and the movement over these faces being a rub in directions continually changing during each revolution there is great equalization of wear without formation of ridges or hollows on the rubbing faces.

In what precedes I have described the construction when the casing A is supplied with the fluid under pressure, this pressure tending to bear the facings H against H′ and so to prevent leakage. It may be readily understood, however, that the cavity B might receive the supply of fluid and the casing A might contain the discharged fluid under reduced pressure. In this case the edge $h^2$ and the hole $h'$ in each facing would have to be altered, so as to bring the opening and closing of the supply and discharge into line with the crank; also, as the facings H would in that case be pressed away from H′, it would be necessary to apply a counter-pressure on the back of H, as is done for relief of pressure on many slide-valves.

Although I have shown the engine, meter, or pump as having three cylinders, that number being sufficient to maintain continuity of movement, obviously a greater number of cylinders might be arranged within a casing to act in the manner described.

Having thus described the nature of my invention and the best means I know of putting it in practice, I claim—

1. In a fluid-pressure engine, the combination, with a closed casing, of a central crank-shaft journaled therein, three or more cylinders and pistons pivotally mounted within said casing and connected with the single crank by a bushed bearing, and facing plates carried by arms oscillated by each cylinder, said plates having openings which register alternately with prime and exhaust openings in the casing, substantially as described.

2. In a fluid-pressure engine, the combination, with a closed casing, of a shaft having a crank within the casing, three or more cylinders and pistons mounted on pivots of oscillation around the crank and each connected therewith, and facing plates carried by arms oscillated by the said cylinders and pistons and covering and uncovering entrance and discharge ports in said casing, one of said oscillating arms on each cylinder being provided with a passage to and from the cylinder, substantially as described.

3. In a fluid-pressure engine, the combination, with a closed casing having prime and exhaust ports, of a crank-shaft, three or more cylinders mounted on pivots of oscillation around the crank within said casing and each having a piston connected with said crank, facing plates mounted upon bearings on the wall of the casing and having peripheral gearing meshing with a central gear controlled from outside, and a hollow arm leading to and from each cylinder and provided with a mouth which is adapted to be opened and closed by the oscillation of the piston upon facing piece, each of the latter being provided with a discharge-opening and an edge, $h^2$, substantially as described.

In testimony whereof I have signed my name to this specification in the presence of two subscribing witnesses.

WILLIAM ANTON GOTTLIEB SCHÖNHEYDER.

Witnesses:
OLIVER IMRAY,
*Patent Agent, 28 Southampton Buildings, London, W. C.*
FREDERICH TAYLOR,
*Mechanical Draftsman, Greenleaf Lane, Walthamstow.*